United States Patent Office 2,815,787
Patented Dec. 10, 1957

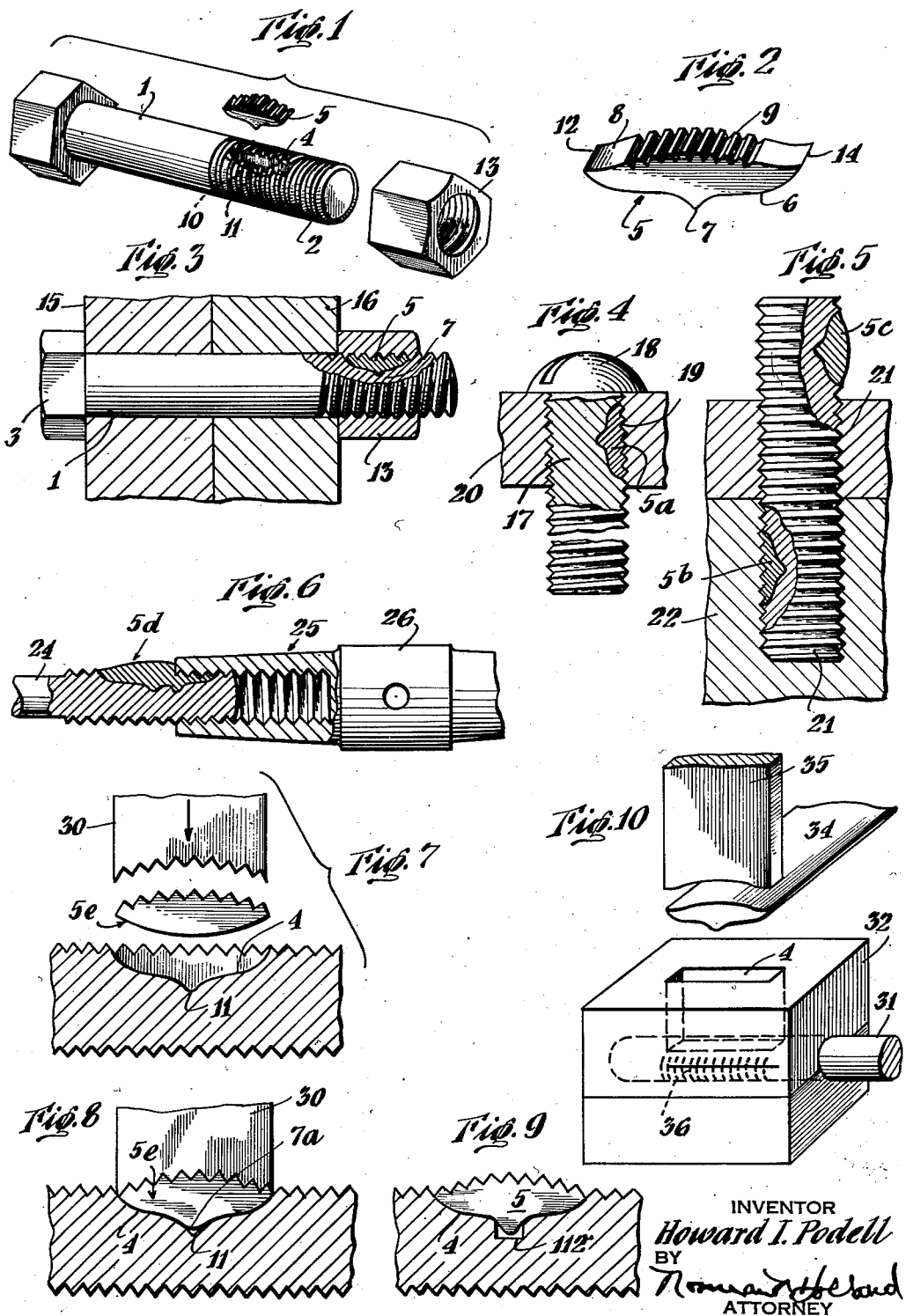

2,815,787

THREADED FASTENER WITH LOCKING INSERT HAVING PROJECTION AND RECESS ENGAGING MEANS

Howard I. Podell, Mamaroneck, N. Y.

Application August 30, 1954, Serial No. 453,078

2 Claims. (Cl. 151—7)

The present invention relates to threaded fasteners such as bolts, screws, turnbuckles and the like and relates more particularly to an improved self-locking insert for such threaded fasteners and a method of manufacture thereof.

There are many types of locking devices in common use such as lock washers and various types of fiber inserts. These known types of locking devices lack certain features which are required in many modern fastenings. Thus, known types of locking devices do not operate satisfactorily where rapid and continuous adjustments are required. Neither do they provide a satisfactory self-locking device for headless types of fastenings such as for set screws and stud bolts. The locking device of the present invention provides a positive locking action and it also allows the threaded member to be readily adjusted. It also may be used on headless types of screw devices such as stud bolts.

The locking device of the present invention represents an improvement over that disclosed in applicant's previous Patent No. 2,533,894. The present device provides an improved insert member which is fastened firmly in the threaded member and which will remain in place during repeated adjustments of the threaded member.

An object of the present invention is to provide an improved self-locking device for threaded fasteners.

Another object of the invention is to provide an improved insert and method of insertion for a self-locking device for threaded fasteners.

Another object of the invention is to provide an improved method of manufacture of a self-locking device for threaded fasteners.

Another object of the invention is to provide an improved method of retaining an insert in a self-locking threaded fastener.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been selected for purposes of illustration and description and is shown in the accompanying drawings wherein:

Fig. 1 is an exploded perspective view illustrating a preferred embodiment of the invention;

Fig. 2 is an enlarged detailed view of the insert member of the invention;

Fig. 3 is an elevation view in section of the device of Fig. 1 used to fasten two members together;

Fig. 4 is an elevational view in section of the self-locking device used with a screw;

Fig. 5 is an elevational view partially in section of the self-locking device used on a stud bolt;

Fig. 6 is an elevational view partly in section of the self-locking device used on a turnbuckle;

Fig. 7 is a fragmentary enlarged view partly in section showing an insert member of modified form above the slotted bolt prior to insertion;

Fig. 8 is a fragmentary enlarged view partially in section showing the insert of Fig. 7 in its inserted position;

Fig. 9 is a fragmentary enlarged view partially in section showing a modified slot shape;

Fig. 10 is a fragmentary, enlarged, perspective view showing a diagrammatic representation of a method of insertion.

Referring again to the drawing and more particularly to Fig. 1 thereof, there is shown a bolt 1 with thread 2 and a head 3. Slot 4 is formed axially of the bolt 1 near the head end of thread 2. Slot 4 is preferably longer in the axial direction than it is in a radial direction. An insert member 5 shown above slot 4 in Fig. 1 is shaped to fit into slot 4. Fig. 2 shows a preferred form of insert 5. The lower surface 6 of insert 5 has a convex shape with a projection 7 midway of its length. The upper surface 8 of the insert 5 in its preferred form is longitudinally convex. Thread 9 is cut into upper surface 8 of the insert 5. The thread of nut 13 will compress the thread 9 when nut 13 is advanced onto bolt 1.

The lower surface 10 of slot 4 is shaped to conform to the lower surface 6 of insert 5. The insert 5 is preferably made of a material which is softer than the nut 13 and which has a degree of elasticity. Materials which are suitable for insert 5 include fiber, plastic, rubber, aluminum or other metallic or non-metallic elastic substances which are softer than the nut.

The insert is forced into the groove 4 with projection 7 on insert 5 fitting into recess 11 in lower surface 10.

In operation the nut 13 is turned along the thread 2 of bolt 1. As the nut 13 reaches the near edge of insert 5, the thread on nut 13 slides easily into the thread on insert 5.

As nut 13 advances further, its thread encounters the higher convex portion of insert 5. The force created by the reduced clearance presses downwardly on the center of elastic insert 5 and forces the ends 12 and 14 of insert 5 outwardly against nut 13. This compression lowers the center portion of insert 5 and raises the ends, thus tending to equalize the jamming force of the insert.

Fig. 3 shows bolt 1 fastening two surfaces 15 and 16 together. Nut 13 has been turned tightly against surface 16 and occupies the portion of thread 2 along which insert 5 runs. The upper surface of insert 5 has been flattened by nut 13 so that it exerts a generally equal force along the axis of nut 13. Projection 7 holds insert 5 in place in slot 4 and being located at the center of insert 5 in an axial direction does not interfere with the above described compression action on ends 12 and 14 of insert 5.

Additional projections such as 7 may be used as desired. For example, two projections may be used with one located at the center of insert 5 in an axial direction and a second located a short distance toward either end of insert 5.

If three or more projections were used, one may be mounted on either side of a center projection.

Since the insert 5 provides a jamming action on nut 13 there is radial force on the insert tending to cause it to slide out of slot 4 as the nut 13 advances. The projection 7 on the bottom of insert 5 retains insert 5 in position in the slot against this force when the nut 13 is screwed on. Projection 7 may have the rounded shape shown in Fig. 2 or may have a more pointed shape or a square shape. Inserts without a projection require an extremely tight fit or the use of adhesive to hold them in place. The insert 5 of the present invention need not be fitted as tightly and is thus more easily inserted and at the same time the possibility of the insert sliding out of the groove is prevented. Since the projections are located at or near the center of the insert 5, they do not interfere with the above described compression action on the insert.

Fig. 4 shows an insert 5a used on a screw. Insert 5a is located near the head 18 of screw 17 and the jamming action is created between the tapped aperture 19 in part 20 and insert 5a.

Fig. 5 shows inserts 5b and 5c used with a stud bolt 21. A similar jamming action occurs between part 22 and insert 5b, as was described above for insert 5 on bolt 1. Since a stud bolt such as 21 has no head, conventional lock washers cannot be used. It has been common practice in using stud bolts such as 21 to provide an oversized bolt to get a jamming action. Once it becomes necessary to remove stud 21 the tapped aperture 22 remains enlarged. It is therefore customary to supply several studs in many applications with increasing sizes to serve as replacements. Insert 5c is similar to insert 5 except that it does not have a pre-cut thread on its outer surface. This modified form acts in the same manner as insert 5. The thread is cut into its surface when a bolt is turned on the stud. This modification may be used on the other fasteners shown in place of insert 5.

Fig. 6 shows an insert 5d used with the end rod 24 of a turnbuckle 25. The barrel portion 26 provides the jamming action in this embodiment. As is more fully described in applicant's Patent No. 2,533,894, the use of a self-locking turnbuckle allows the elimination of the lock pins which are used on conventional turnbuckles to prevent undesired loosening due to jars and vibrations. On applications such as aircraft control wires where turnbuckles are used to adjust their length, removal of two lock pins for each turnbuckle before adjustment and their replacement thereafter is a time-consuming process. Use of the insert of the present invention allows turnbuckle adjustment to be made with great time savings. Fig. 6 shows the turnbuckle barrel portion 26 partially covering the insert 5d. The right-hand end of insert 5d has been forced upward by the above described compression action of the material forced downwardly at the center of insert 5d. Further advancement of barrel 26 will advance its end beyond the center and will cause a compression action at the left-hand end of insert 5d. In this embodiment insert 5d is shown with two projections 7d.

Figs. 7 and 8 show a modified form of insert 5e which has no projection on its lower surface before insertion. However, when it is forced into the slot 4 it is held by a holding action similar to that of the insert 5 with the preformed projection 7. In Fig. 7 the insert 5e is shown in a location just above slot 4 prior to insertion. The bottom of insert 5e and slot 4 are generally similar except for the central portion of slot 4 which has a groove-like indent 11.

Fig. 8 shows the tool 30 forcing insert 5e into slot 4 and shows the non-rigid material of the insert being forced into at least a portion of the indent 11 so that a projection 7a similar in its effect to the projection 7 on insert 5 is formed. This method of forming the improved insert with a gripping projection 7a is simple and efficient since the aligning of a projection on the insert 5e with the indent 11 is not necessary. The insert 5e is merely aligned with the surface of thread 2 so that the edges 12a and 14a of the insert lie below the tops of the threads. The screwing of a nut over the insert 5e tends to increase the pressure on the insert and to increase the penetration of the insert into the indent 11.

Fig. 9 shows a modified form of slot where the indent 112 is made by drilling a shallow hole at the lowermost portion of the slot 4. This hole provides a rapidly-made and inexpensive indent for the projection 7 or 7a.

Fig. 10 shows a perspective diagrammatic representation of a method of forcing an insert into the slot 4 which may be used with the inserts 5 through 5e shown in Figs. 1 through 9.

The slotted, threaded member 31 is held by a suitable jig 32 with a die slot 37 in its upper surface. Insert material 34 is positioned above jig 32 and a punch 35 is mounted for reciprocal action above the material 34. Punch 35 on its downward stroke forces material 34 downward against jig 32 and cuts out an insert blank in accordance with the shape of the slot 37 in jig 32. Punch 35 continues downward forcing the insert cut from material 34 down into slot 4 in member 31. The lower surface of punch 35 is suitably shaped to conform to the convex or other shape desired on the top of the insert. Material 34 may be a continuous strip fed under punch 35 by a roller system (not shown) and may have any desired cross section. Thus the material 34 could have either the vertical cross section of the modified insert 5e with the smooth lower edge. An external thread also may be punched or chased on the insert. If the thread is to be punched into the surface of insert 5 the lower surface of punch 35 has a thread cut in it. If the thread is to be chased, the jig holding the threaded member 31 has thread 36 cut in its inner gripping portion. After the punch 35 has forced an insert into slot 4, the jig 32 or member 31 is rotated a fraction of a turn chasing a thread on the insert.

The method of insertion shown is thus capable of cutting an insert from stock, inserting it in the threaded member, forming a projection 7 on the insert when needed, and stamping or chasing the desired thread on the insert exterior.

Thus it can be seen that an insert has been provided for a threaded fastener which is easier to manufacture, is more reliable than known ones and which is also adaptable to an automatic insertion process.

As various changes may be made in the form, construction, and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. A threaded member for use in a device of the class described for retaining thereon a second threaded member comprising a member having an elongated threaded portion, an elongated recess extending longitudinally of said elongated threaded portion and having a concave bottom surface with an indent therein positioned substantially medially of the ends of the elongated recess, an elongated insert member formed of a resilient plastic material in said recess having a substantially convex lower surface conforming generally to the concave bottom surface of said elongated recess, said lower surface of said elongated insert having a projection intermediate its ends of smaller volume than said indent in said bottom surface of said recess and positioned to partially fill said indent, said elongated insert having a substantially longitudinally extending convex upper surface projecting above the edges of said recess prior to the screwing together of the said threaded members along each other and over the insert member and adapted to be contacted by the threads of the second threaded member when it is screwed onto said recessed threaded member, the outermost portion of said insert being positioned opposite the indent in said recess and the projection on said insert whereby the contacting of the insert by the second threaded member forces said outermost portion of said insert inwardly to increase the penetration of said insert in said indent and lock said projection tightly into said recess and to minimize unintentional disengagement of the threaded members and whereby the concave bottom of said recess curls the opposite ends of said insert outwardly as its outermost portion is forced inwardly by said second threaded member so that the contact pressure between the threads of the second threaded member and the said elongated insert is substantially equalized along its length.

2. The threaded member as claimed in claim 1 in which said indent in said bottom surface of said recess has cylindrical side walls.

(References on following page)

References Cited in the file of this patent

UNITED STATES PATENTS

| | | |
|---|---|---|
| 248,975 | Woolten | Nov. 1, 1881 |
| 1,495,687 | Grosclaude | May 27, 1924 |
| 2,159,866 | Simmonds | May 23, 1939 |
| 2,348,308 | Richardson | May 9, 1944 |
| 2,378,610 | Wesley | June 19, 1945 |
| 2,425,104 | Luce | Aug. 5, 1947 |
| 2,533,894 | Podell | Dec. 12, 1950 |
| 2,663,344 | Burdick | Dec. 22, 1953 |
| 2,668,966 | Corlett et al. | Feb. 16, 1954 |